Figure 1:
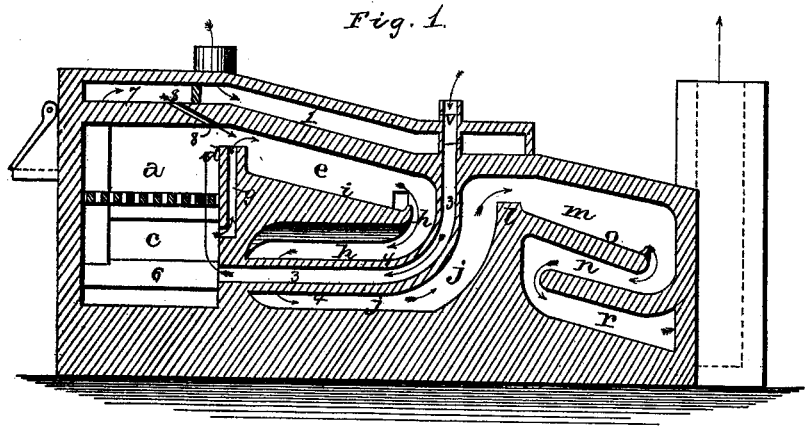
Figure 2:
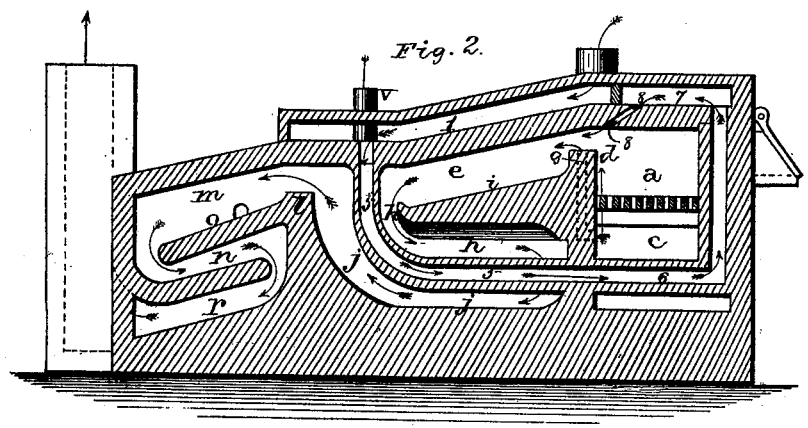

W. L. McNAIR.
GAS FURNACE.

No. 175,131. Patented March 21, 1876.

WITNESSES.

INVENTOR.

UNITED STATES PATENT OFFICE.

WILLIAM L. McNAIR, OF ALLEGHENY, PENNSYLVANIA.

IMPROVEMENT IN GAS-FURNACES.

Specification forming part of Letters Patent No. 175,131, dated March 21, 1876; application filed December 23, 1875.

*To all whom it may concern:*

Be it known that I, WILLIAM L. McNAIR, of Allegheny, in the county of Allegheny and State of Pennsylvania, have invented certain new and useful Improvements in Heating-Furnace; and I do hereby declare the following to be a full, clear, and exact description of the invention, such as will enable others skilled in the art to which it pertains to make and use it, reference being had to the accompanying drawings, which form part of this specification.

My invention relates to an improvement in heating-furnaces; and it consists in the arrangement and combination of parts that will be more fully described hereinafter.

The accompanying drawings represent my invention.

$a$ represents the furnace; $c$, the ash-pit; and $d$, the bridge that divides the heating-chamber $e$ from the furnace. Passing up through the bridge from below in the ash-pit are the air-flues $g$, through which air is drawn for the purpose of supplying oxygen to the flames, and thus causing a complete combustion. As the products of combustion pass over the bottom $i$ of the chamber $e$ the iron contained therein is raised to any degree of heat that may be desired, and then the products pass down into the flue $h$ underneath the floor $i$, so as to heat it from the under side, and thus utilize as far as possible heat that would otherwise be wasted. The heat and products of combustion pass from the flue $h$ into the return flue $j$ up over the bridge $l$ into and through the second heating-chamber $m$. The iron to be heated is first placed in this chamber, where it is heated to a cherry-red, and is then transferred to the first chamber $e$ to be still further heated, and thus the two chambers are alternately used on each charge with the exception of the first ones. The heat and products of combustion pass from this chamber $m$ down into the flue $n$, heating the floor $o$, as already described, then through the return-flue $r$ up the stack.

In using this furnace it is designed to use gas as a fuel wherever it can be obtained, and an air-chamber, 1, is made over the heating-chamber $e$, through which the gas is passed in the pipe $v$ down through the flue 3 in the wall 4 into the ash-pit, and from thence up to the proper burning-place. There may be more than one flue through this wall, or the flue may be built inside of the flue $h$, as may be preferred. This gas, in its passage through the flue, is heated to a high degree, so that its combustion gives the most intense heat. Air is admitted into the chamber 1, where it is heated to a high degree, and from thence it passes down through the flue 5, up through the pipe 6 into the chamber 7, immediately over the furnace, and from this chamber it is passed through the openings 8, and strikes the burning gases over the bridge $d$, so as to cause a perfect combustion. This air is admitted from above, so as to cause a more thorough commingling with the gas, as the gas is much the lighter of the two, and would otherwise rise up above the air.

If so desired, the bottom of the chamber $e$ may be made concave, and used for puddling iron or melting steel, instead of simply heating iron, as here described. One air-chamber instead of two may be used, if so preferred.

Having thus described my invention, I claim—

The combination of the gas flue or flues 3, the air-chamber 1, flue 5, pipe 6, and chamber 7, substantially as described.

In testimony that I claim the foregoing I have hereunto set my hand this 17th day of November, 1875.

WILLIAM L. McNAIR.

Witnesses:
ROBT. M. BARR,
F. A. LEHMANN.